(12) United States Patent
Sharp

(10) Patent No.: US 7,311,126 B2
(45) Date of Patent: Dec. 25, 2007

(54) GRAPPLE HEAD ASSEMBLIES WITH CUT-OFF SAWS

(76) Inventor: Rodney Warwick Sharp, 23 Thompson Ave, Hamilton (NZ) 2001

( * ) Notice: Subject to any disclaimer, the term of this patent is extended or adjusted under 35 U.S.C. 154(b) by 0 days.

(21) Appl. No.: 11/092,568

(22) Filed: Mar. 29, 2005

(65) Prior Publication Data

US 2005/0211338 A1 Sep. 29, 2005

(30) Foreign Application Priority Data

Mar. 29, 2004 (NZ) .................................. 532008

(51) Int. Cl.
*A01G 23/08* (2006.01)

(52) U.S. Cl. ........................................ 144/4.1; 144/34.1

(58) Field of Classification Search ................ 144/4.1, 144/34.1, 34.5, 34.6, 24.12; 30/134, 228
See application file for complete search history.

(56) References Cited

U.S. PATENT DOCUMENTS

| 5,390,715 | A | * | 2/1995 | Luscombe | ............... 144/24.13 |
| RE35,432 | E | * | 1/1997 | LaBounty et al. | ............ 30/134 |
| 6,182,722 | B1 | | 2/2001 | Ornberg | |
| 6,374,877 | B1 | * | 4/2002 | Wildey | ....................... 144/4.1 |
| 6,408,906 | B1 | * | 6/2002 | Moon et al. | ............. 144/24.13 |

* cited by examiner

*Primary Examiner*—Shelley M. Self
(74) *Attorney, Agent, or Firm*—Young & Thompson

(57) ABSTRACT

The present invention relates to a grapple (1) with cut-off saw (30) in which the motor (20) for driving the saw (30) is mounted inboard, and within the head portion (2) of the grapple. In a preferred embodiment drive from the motor (20) passes through a hollow pin (10) which also supports one of the jaws (4). The head portion (2) thereby acts as a housing for the motor (20) protecting it from impact.

10 Claims, 3 Drawing Sheets

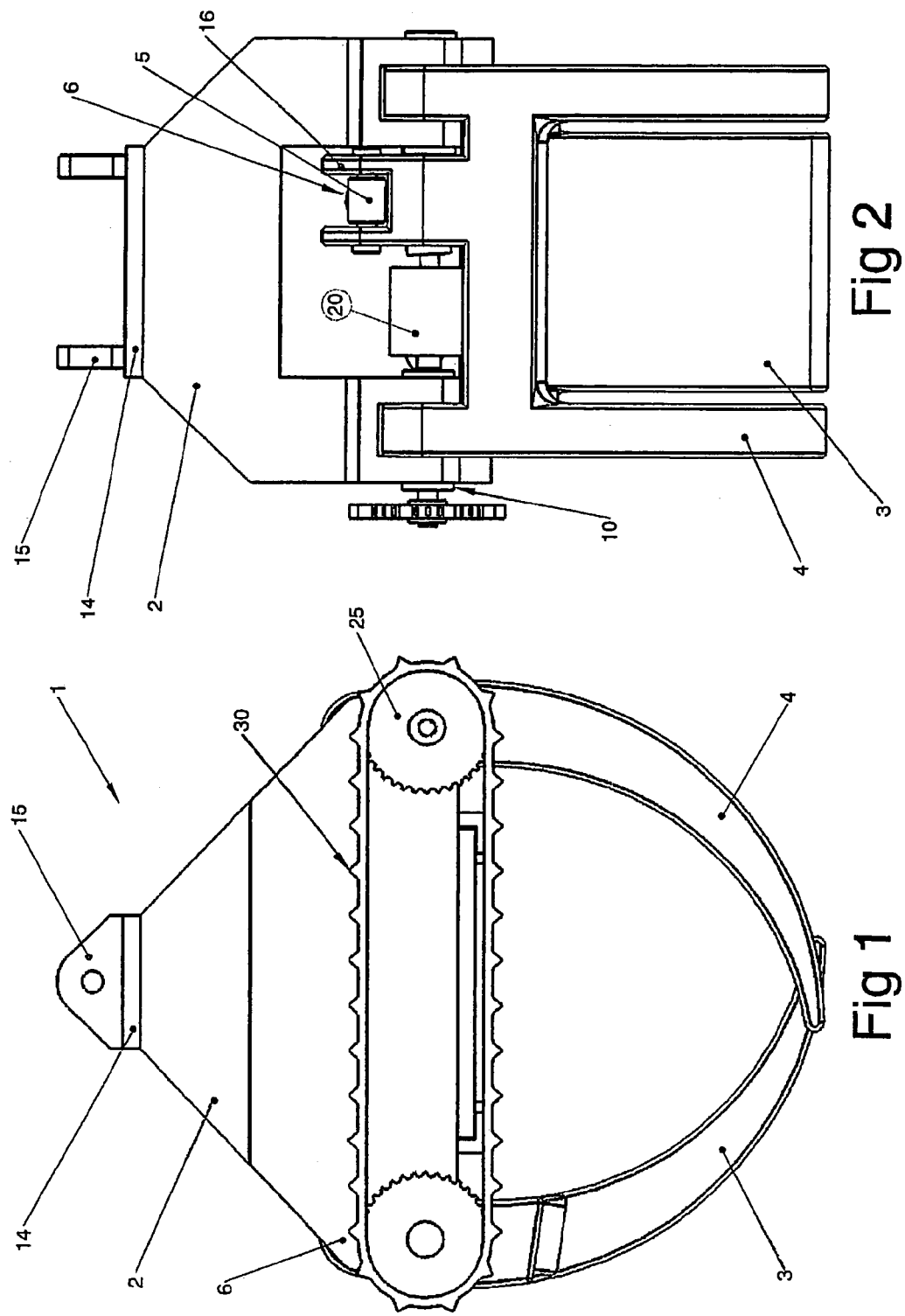

GRAPPLE HEAD ASSEMBLIES WITH CUT-OFF SAWS

FIELD OF INVENTION

The present invention is directed to grapple head assemblies, typically for use within the logging industry. In particular the present invention is directed to grapple head assemblies which include a cut-off saw mounted on the head assembly, and drive means therefor. The saw is commonly used for trimming logs after they have been set down by the grapple head assembly.

BACKGROUND DESCRIPTION

The present invention concerns itself with modifications to grapple head assemblies. For simplicity of description the type of grapple assembly most commonly referred to within the specification shall be a bunching-type grapple assembly though it is envisaged that the present invention may also be incorporated onto other types of grapple assemblies.

Bunching-type grapple assemblies are commonly used in the logging industry, and the problems arising in this industry have been in the mind of the inventor during the development of this invention. In this industry grapples are commonly used for moving logs—often for loading onto the back of a logging truck, stacking for future use or processing, or loading into processing apparatus. Depending upon the type of processing apparatus (typically a de-limber), the grapple may have a further role insofar as dragging the log through the de-limbing apparatus. As de-limbing apparatus which includes means for driving the log is a substantially more expensive than non-driven types of de-limbing apparatus, it is not uncommon for grapples to also be used in the role of dragging logs through the de-limber. Accordingly, grapples used in the logging assembly can be used in a number of roles and consequently are subjected to quite a bit of abuse.

As it is often necessary to trim large logs into smaller segments for transport or processing, grapple design has evolved to include cut-off saws enabling a log to be trimmed after being set down by the grapple. This can provide a significant advantage as a single operator, being the person in charge of the grapple and the equipment to which it is attached, can also attend to the trimming of logs. The alternative is to employ an additional person whose sole purpose it is to trim the logs into smaller segments which must then be picked up and placed appropriately by the grapple in any event. Not only does this alternative employ more people (and hence less cost effective), it can also be slower in terms of throughput and can expose the ground operator to some risk. The consequence is that grapples with attached cut-off saws are very popular—particularly in smaller operations which cannot afford to employ additional staff, or whose total throughput may not warrant the hiring of additional staff for specific roles.

The standard design of grapples with a cut-off saw is to take a substantially standard grapple and to mount to the outside—typically to the front or back depending on orientation—a saw with motor assembly. Typically this is a chainsaw, so as to achieve the necessary length of cut exceeding a typical log's diameter. This is generally pivotally mounted toward one end of the grapple (e.g. left or right when viewing the grapple assembly from the front). Typically it is pivotally mounted to the outside of the grapple's head portion, and often in proximity to the pivot pins connecting a jaw to the head portion of the grapple assembly. There is typically additional drive means to drive the saw blades to pivot downwardly so as to cut through a log which may still be substantially held or cradled within the arms of the grapple assembly.

To the outside of the saw blade assembly is provided a saw motor—that is to say, the saw blade is positioned between the outside of the head portion, and the saw motor which extends outwardly from the grapple. The saw blade assembly and motor is very much a bolt-on type assembly added as an after thought to original grapple designs. While this design is very effective, it does suffer from a number of not insignificant problems in use.

Firstly, the motor and saw blade assembly are quite fragile. Heavy impact can seriously damage or destroy the exposed motor and saw blade assembly. At the very least, contact between the motor or saw blade assembly with obstacles, during use of the grapple assembly, can distort components and place the blade assembly out of alignment. This affects the ability of the equipment to cut through a log. To repair or replace components can be very expensive, and can also lead to significant downtimes in terms of operations. Such delays are not acceptable for most logging and processing operations as operation may be suspended until repairs are made, or ground staff hired to manually trim logs.

The art has sought to address this by providing protective frames and covers for the motor and blade assembly. However these have only been mildly effective at best. If one considers the typical environment of a logging operation, and the requirement for logs to be processed quickly, as well as the various roles that the grapple may be used for, it is not surprising that contact is made by the side of a grapple with various obstacles. Given also the average weight of the grapple is at least half a ton, and often higher, there is considerable momentum and kinetic energy to be dissipated when the grapple does encounter an object or obstacle. Accordingly, damage to saw mechanisms and associated componentry is quite common and remains an Achilles heel of this type of grapple assembly.

Additionally, the outside placing of the saw blade motor assembly tends to unbalance the grapple assembly, as well as exposing even further a vulnerable component. The increased offset weight of the saw motor, is not particularly desirable as it unbalances the assembly. The art has attempted to address this by the provision of counterweights on the opposite side. However this tends to increase the overall weight and hence reduce the lifting capacity of any apparatus using the grapple assembly. The provision of protective covers to protect the motor and saw blade further exacerbates this problems to the extent that they cannot be adequately compensated for by counterweights. Accordingly, at best, any protective covers or shielding is a compromise between weight and strength. Again this represents an unsatisfactory solution to a problem plaguing this type of grapple assembly within the industry.

Therefore there is a need for an improved grapple with cut-off saw design which is less susceptible to damage through impact, and ideally is also more centrally balanced.

It is an object of the present invention to address these problems.

It is also an object of the present invention to provide an alternative grapple assembly in which the saw motor is less susceptible to damage from impact.

It is a further objective of the present invention to propose a design for an improved grapple assembly which is more balanced in terms of its centre line when viewed from the end.

At the very least it is an object of the present invention to provide the public with a useful alternative.

Aspects of the present invention will be described by way of example only and with reference to the ensuing description.

GENERAL DESCRIPTION OF THE INVENTION

According to one aspect of the present invention there is provided a grapple head assembly which includes a head portion, and jaws pivotally attached to the head portion; there also being included a pivoting saw assembly positioned to the outside of the head portion, and also a saw motor therefor; said saw motor being positioned substantially to the inside of the head portion.

According to another aspect of the present invention there is provided a grapple head assembly, substantially as described above, which includes transmission means for transmitting drive from said saw motor to the saw assembly.

According to another aspect of the present invention there is provided a grapple head assembly, substantially as described above, in which the jaws are attached to the head portion by pivot pins.

According to another aspect of the present invention there is provided a grapple head assembly, substantially as described above, in which at least one said pivot pin connecting a jaw to the grapple head portion is hollow.

According to another aspect of the present invention there is provided a grapple head assembly, substantially as described above, in which said transmission means passes through a said hollow pivot pin.

According to another aspect of the present invention there is provided a grapple head assembly, substantially as described above, in which said transmission means comprises a drive shaft which is located within said hollow pivot pin.

According to another aspect of the present invention there is provided a grapple head assembly, substantially as described above, in which said drive shaft is supported by bearing assemblies within said hollow pivot pin.

According to another aspect of the present invention there is provided a grapple head assembly, substantially as described above, in which said saw assembly is removably connected to the drive shaft.

According to another aspect of the present invention there is provided a grapple head assembly, substantially as described above, in which the saw assembly comprises a chainsaw.

According to another aspect of the present invention there is provided a grapple head assembly, substantially as described above, in which the saw assembly is pivotable about an axis co-axial with that of a pivot pin.

According to another aspect of the present invention there is provided a grapple head assembly, substantially as described above, in which said motor is substantially in-line with said pivot pin through which the transmission means passes.

According to another aspect of the present invention there is provided a grapple head assembly, substantially as described above, in which the saw motor is hydraulically powered.

According to another aspect of the present invention there is provided a grapple head assembly, substantially as described above, which includes means for controlling pivoting of the saw assembly.

According to another aspect of the present invention there is provided a grapple head assembly, substantially as described above, in which said means for controlling pivoting of the saw assembly is positioned to the outside of the head portion.

According to another aspect of the present invention there is provided a grapple head assembly, substantially as described above, in which said means for controlling pivoting of the saw assembly is fixed to the head portion.

According to another aspect of the present invention there is provided a grapple head assembly, substantially as described above, in which there is provided a cylinder influencing the opening of the jaws, and wherein the jaw yoke portion to which it is attached is offset from the centerline of the grapple (when viewed from the end) to accommodate the position of the saw motor.

According to another aspect of the present invention there is provided a grapple head assembly, substantially as described above, in which the motor for the saw assembly is positioned, when the grapple head assembly is viewed from above, according to at least one of:

inwardly of the outermost edges of the head portion;
  between pivot pins connecting a jaw to the head portion;
  within vertical planes passing through the connecting portions of a jaw, the connecting portions representing that part of a jaw through which a pivot pin passes for its pivotable connection to the grapple head portion.

According to another aspect of the present invention there is provided a grapple head assembly, substantially as described above, in which the saw motor is substantially within the projected footprint of the grapple head assembly.

According to another aspect of the present invention there is provided a grapple head assembly, substantially as described above, in which the saw assembly's drive motor is substantially within the projected footprint of the jaws of the grapple head assembly when the jaws are folded closed.

According to another aspect of the present invention there is provided a grapple head assembly, substantially as described above, in which the grapple assembly is a bunching type grapple.

According to a further aspect of the present invention there is provided log handling apparatus incorporating a grapple head assembly, substantially as described above.

According to another aspect of the present invention there is provided log handling apparatus, substantially as described above, which comprises an excavator to which the grapple head assembly is attached.

According to a further aspect of the present invention there is provided a method for modifying a grapple head assembly to include a cut-off saw assembly, said method comprising the positioning of a pivoting saw assembly outwardly of the projected footprint of the grapple head assembly, and a drive motor therefor within said projected footprint.

According to another aspect of the present invention there is provided a method, substantially as described above, wherein the saw assembly's drive motor is substantially within the projected footprint of the jaws of the grapple assembly when the jaws are folded closed.

According to another aspect of the present invention there is provided a method, substantially as described above, which includes transmission means from the motor to the saw assembly.

According to another aspect of the present invention there is provided a method, substantially as described above, in which said transmission means passes through a hollow pivot pin connecting a jaw to the grapple's head portion.

According to another aspect of the present invention there is provided a method, substantially as described above, in which a hollow pivot pin, for accommodating transmission means, replaces a solid pivot pin in the grapple.

According to another aspect of the present invention there is provided a method, substantially as described above, in which a primary cylinder for opening and closing the jaws, is positioned offset from the centerline, when viewed from the end, to accommodate the saw motor.

According to a further aspect of the present invention there is provided a grapple head assembly, modified according to a method substantially as described above.

For the purpose of this specification, several definitions and terms will be defined to avoid confusion. For instance, when it is indicated that we are viewing the grapple from the front, then a grasped log will be extending towards and away from the viewer. The axis of the log will also be substantially parallel to the axes about which the jaws of the grapple rotate.

When it is indicated that the viewing the grapple from the end, then a contained log will appear to extend left and right from the perspective of the viewer. One jaw, when the jaws are being opened, will extend towards the viewer, and will move away as they are being closed. The other jaw will typically perform the opposite action, depending on specific jaw design.

Reference will occasionally be made to a footprint with respect to one or of the components. This is an imaginary region such that, if the particular component being referred to is viewed from above, the footprint represents the outermost outline of the component and the area contained therein. Alternatively it may be described that the components were placed on the ground and impressed to its widest points, the footprint will encompass all the area within the impression that it leaves.

It is also noted that when the term footprint is used, it is often referred to as being projected upwardly so as to define a volume. A component which is said to lie within this projected footprint shall substantially lie within the resulting volume of the footprint as extended vertically.

Typically a grapple head assembly according to the present invention will comprise a grapple head portion and a set of grapple jaws. Typically the head portion is that part by which the grapple may be attached to other apparatus, but more predominantly is to provide a support structure for the jaws. Typically the jaws are attached to the head portion by pivot pins.

This construction and componentry is fairly common to various types of grapples including two-pin grapples, single pin grapples (where a single pivot pin common to both jaws is used) and also including bunch-type grapple assemblies. For simplicity, the ensuing description shall refer to bunch-type grapple assemblies, unless specifically stated otherwise, as these represent the preferred type of grapple assembly in the logging and forestry industries. It shall also be assumed that a skilled addressee of the art will be able to apply the invention to the other types of grapple assemblies given the description herein.

As for most of the prior art types of grapple head assemblies having a cut-off saw assembly, the present invention also includes a cut-off saw assembly, or at least provision for the attachment thereof. As will be seen later, preferred embodiments of the present invention will allow the saw assembly to be easily detached from the unit for replacement, repair, or when not required. Typically such a saw assembly will be positioned on the outside of the head portion of the grapple assembly, and may also be contained within protective shielding.

The primary difference between the present invention, and the prior art, is in the positioning of the saw motor, and how it drives the saw assembly. Unlike the outboard motor position arrangement used in all of the prior art, the present invention places the motor assembly inboard of the saw assembly. The actual position of the motor may be described in a number of ways, depending upon the particular embodiment. Preferably, the motor is positioned within the projected footprint of the head portion. More ideally the motor is placed within the projected footprint of the jaws of the grapple assembly when they are in a folded or closed position.

If one looks at most grapple assemblies from the end, there may be provided a front and back pivot pin for a jaw assembly. Typically positioned within these pins is componentry associated with the cylinders for opening and closing the jaws. However within the general vertical planes representing the footprints of these pins, is ideally placed the motor in preferred embodiments of the present invention. This arrangement can be more effectively seen in the drawings which follow later.

Placing a motor in an inboard position provides several potentially realizable advantages, but also presents several problems. Of the potentially realizable advantages is the fact that weight which would normally placed far from the centre line of the grapple assembly (when viewed from the end) in an outboard type arrangement, is now placed closer to its middle centre line. This has a significant advantage in terms of maintaining the balance of the grapple assembly.

Secondly, locating the motor in this position effectively shields it from most of the knocks and abuse to which it might otherwise be subjected during normal use of the grapple assembly. This also applies to the conduits and cabling which connect to the motor. Most motors are hydraulically driven and thus protection for the hydraulic fluid lines is desirable. Positioning the motor within the head portion also negates the need for protective shielding for the motor, though may still be required for the cut-off saw. Nevertheless, weight reductions can still be achieved, which is particularly important when it is considered that this saved weight would normally—in an outboard type arrangement—have been significantly distanced from the centre line (and preferred centre of mass) of the grapple head assembly.

However, problems which are presented and which needed to be addressed include locating a position within the confines of the grapple assembly where a motor can be placed. Secondly, there is a problem of how drive can be transmitted from an inwardly placed motor to an outwardly placed saw assembly.

The present invention also considers and addresses these problems. Taking the second point into consideration, it has been found that drive from the motor may be satisfactorily transmitted to the saw assembly by means of transmission means (typically a drive shaft) passing through a hollowed pivot pin. This may be a jaw pivot pin, though it is envisaged that the motor and cut-off saw may be positioned offset from a jaw pivot pin, and for drive to be transmitted through the head portion anyway from the motor. For simplicity though, the description will refer to the preferred arrangement where drive passes through a jaw pivot pin, though this does not exclude other arrangements from being within the scope of the present invention.

This allows for direct drive of the saw assembly, providing that is suitably positioned on the outside of the head portion. Normally this is not a problem. Hence, drive can be effectively transmitted from a motor to the saw assembly, typically by a short drive shaft. This may be supported within the hollow pin, or aperture through the head portion, by bearing assemblies.

Various other transmission arrangements may be employed. Possible further arrangements include offsetting the drive motor from the axis of the pin (or aperture), or even orienting the motor such that the transmission drive shaft is substantially perpendicular (with respect to the drive axis of the motor) to the motor. Various additional transmission components may be required for these options.

Rapid disconnection of the saw assembly is also achievable without the need to remove the motor and/or transmission means. This can be very effective in terms of replacing or removing a saw assembly for various reasons required by a user (such as repair, or not required for use).

The pin (or a sleeve therein) may also be configured to rotate within its housing, and the saw mount may be coupled to the rotatable pin portion so as to allow its rotation.

The inboard positioning of the motor is preferably accommodated by suitable redesign of the 'internal' componentry and general design of the grapple assembly. As mentioned previously, the primary components within the region between the pivot pins (when the grapple is being viewed from the end) is the jaw cylinder, various yokes and componentry to which they connect, and any timing links (connecting the jaws in bunch-type grapple assemblies). It has been found that these components can still work satisfactorily if their position is offset from the centre (when the grapple is viewed from an end), rather than being substantially centrally placed. Some consideration may need to be given to reducing the dimensions of user-selected components (e.g. the cylinder) and varying dimensions. However, such offsetting has been found able to free sufficient room for a motor of sufficient capacity to drive the saw assembly. Changing the position or orientation of the motor within the head portion can provide additional opportunities and options.

Offsetting componentry such as the jaw opening cylinder, and associated componentry, also affects the centre of balance of the grapple assembly when viewed from the end. In some situations it may even counterweight, or at least partially counterweight, protective covers provided on the outside of the head portion for the saw assembly. Accordingly, preferred embodiments of the present invention possess very good centre line balance, from the perspective of the grapple assembly being viewed from an end. As also mentioned previously, this can eliminate the need for extra counter weighting, which is typically 'dead' weighted material which reduces the lifting capacity of apparatus with which the grapple assembly is used.

As can be appreciated the present invention can provide a number of potentially realizable advantages over the prior art which has evolved along a specific path of design. The present invention therefore represents a significant change of direction from this path of design, and has the potential to address the Achilles heels affecting these prior art units. It is also envisaged that the greater durability of the present invention once again opens up grapple assemblies of the present invention to roles which may be denied to, or which limit, the prior art equivalent by virtue of their more fragile or vulnerable nature.

Further aspects of the present invention will become clearer by virtue of drawings in detailed description to follow.

DESCRIPTION OF DRAWINGS

FIG. 1 is a front diagrammatic view of the preferred embodiment of the grapple head assembly according to the present invention, FIG. 2 is a partial cross-sectional end view of the embodiment of FIG. 1.

DESCRIPTION OF PREFERRED EMBODIMENT

Figure 3:
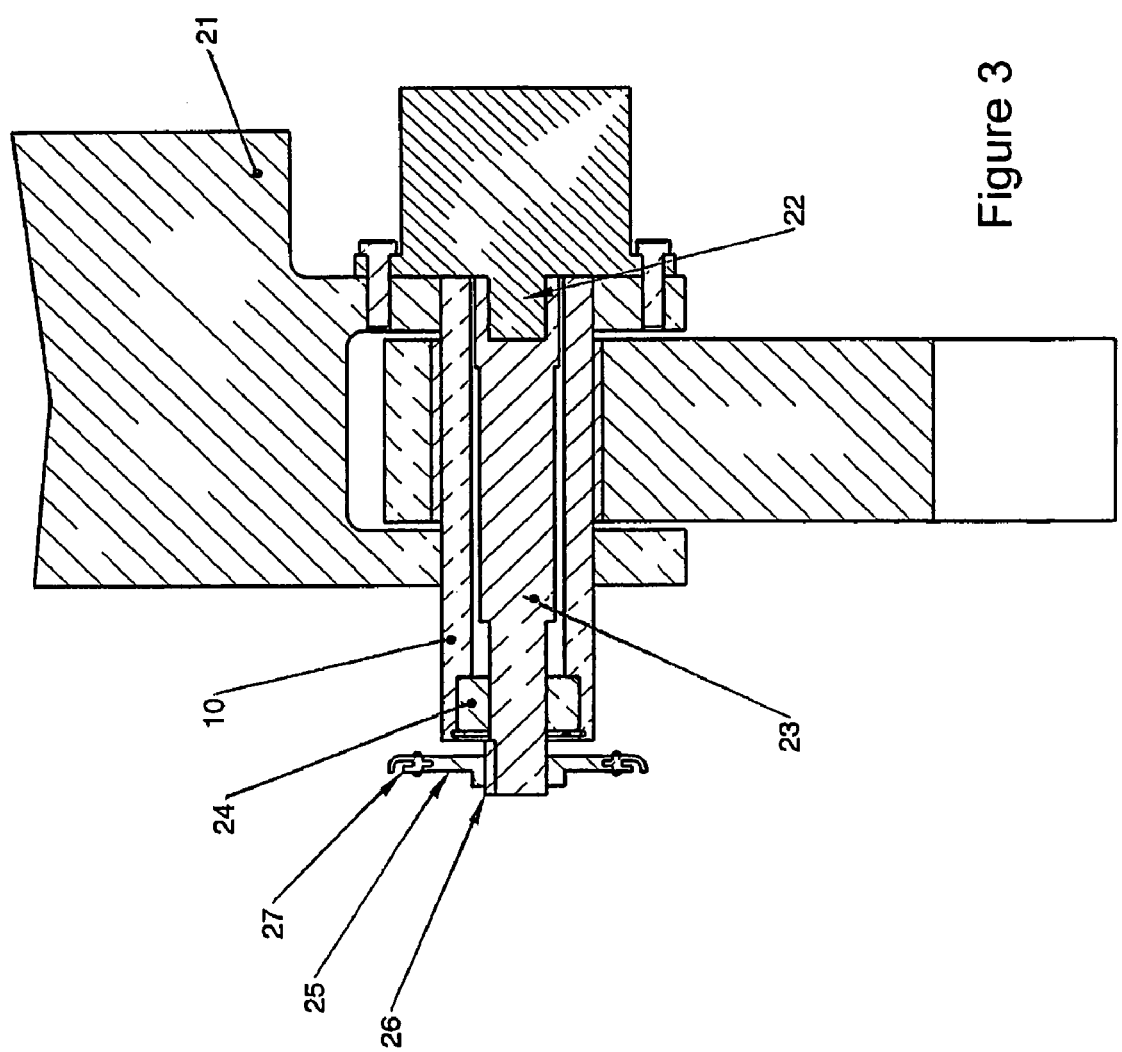
FIG. 3 is a close-up cross-sectional view of the motor and saw blade assembly of the embodiment of FIG. 1.

With reference to the drawings by way of example only there is provided a grapple head assembly, generally indicated by arrow 1, consisting of a grapple head portion and a set of grapple jaws (3, 4). In FIG. 1 a bunch-type grapple is shown and hence there is also included a jaw opening cylinder (5) and a timing link (6). The jaws (3, 4) are each connected to the head portion (2) by a front pivot pin (10) and rear pivot pin (11).

At the top of the head portion may be provided a rotary unit (14) and connection means (15) for attachment to suitable apparatus.

Referring to FIG. 2 the cylinder (5) and its connecting yoke (16) on jaw (4) can be seen. It can be also seen that both the yoke (16) and cylinder (5) are offset to the right of the centre line of the grapple head assembly (1). This allows room for inboard motor (20) to be placed. This is typically a hydraulic motor of sufficient capacity to drive the saw blade assembly generally indicated by arrow 30.

FIG. 3 provides additional detail of the motor (20) and transmission means. As can be seen the motor (20) is bolted to a downward yoke portion (21) on the head portion (2).

This yoke portion (21) also supports the pivot pin (10), which in this case is a hollow pin. Positioned within the hollow interior of pin (10) it is then noticed output shaft (22) which is connected to a drive shaft (23) supported at the outer end by bearing (24). Connected to the outer most end of this drive shaft (23) is a drive sprocket (25) with a keyed (generally indicated by arrow 26) relationship with the drive shaft. This drive sprocket drives the chain (27) of the saw assembly (30).

FIG. 4 illustrates again in partial cross-section a preferred arrangement according to the present invention. More clearly visible is the bearing (40) on which the body (41) of the chain saw is mounted. Visible is the chain saw bar (42) with chain excluded for simplicity, and the cylinder (43) for pivoting the bar (42) downwardly to perform a cutting operation.

Figure 5:
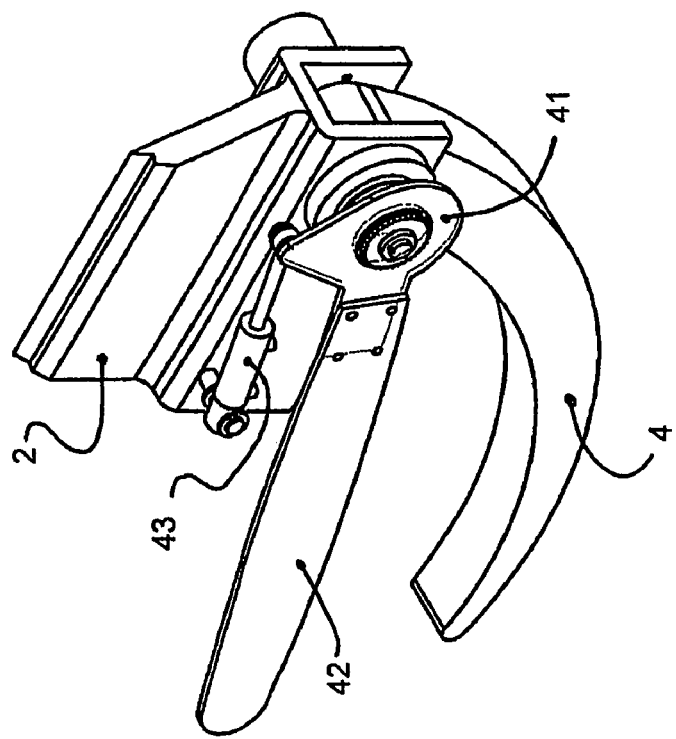
FIG. 5 is a perspective diagrammatic view of the embodiment of FIG. 4.
Figure 4:
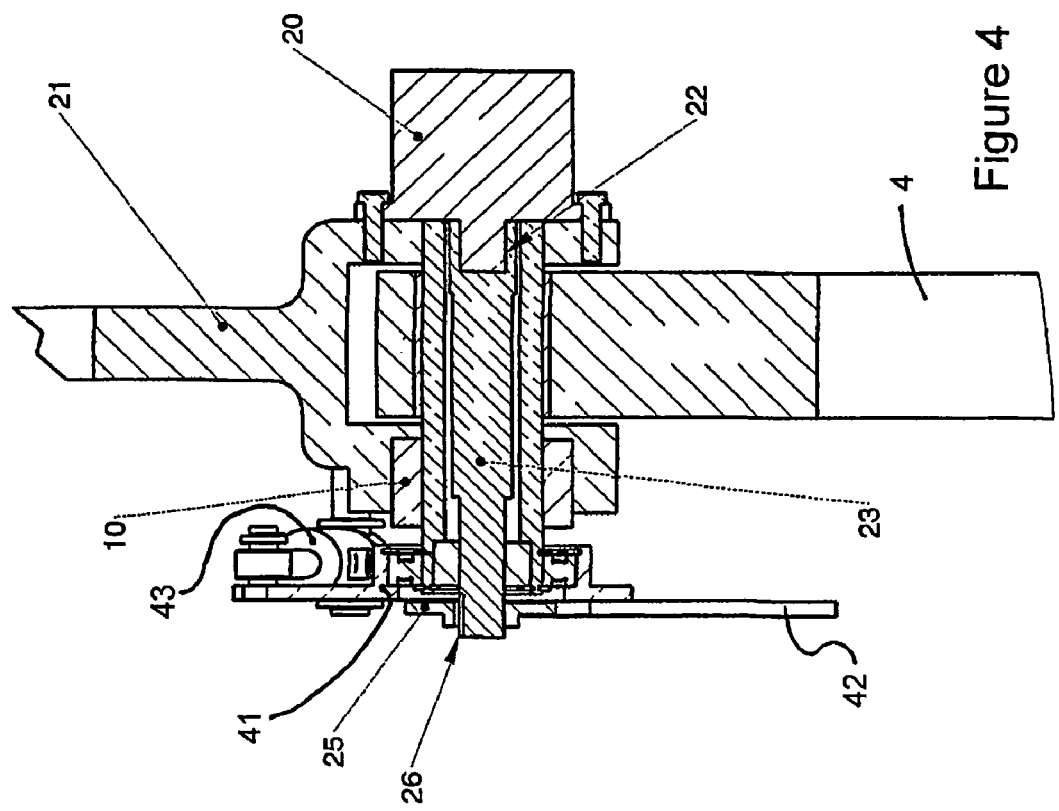
FIG. 4 is a partial cross-sectional view of a motor and saw blade assembly showing also the chain-saw blade and controlling cylinder, in a preferred embodiment.

FIG. 5 is a perspective view of the arrangement of FIG. 4. The connection of the cylinder (43) at one end to the head portion (2) of the grapple, and at its other end to the chain saw body (41), is more clearly seen.

A preferred saw motor (20) is a hydraulic motor having a maximum rpm ideally around 7000 rpm, with a flow of around 200 L/min. A preferred motor is a Bosch Rexroth A2FM-032. However the choice and characteristics are largely one of user choice.

Aspects of the present invention have been described by way of example only and it should be appreciated that modifications and additions may be made thereto without departing from the spirit or scope of the present invention as described herein.

It should also be understood that the term "comprise" where used herein is not to be considered to be used in a limiting sense. Accordingly, 'comprise' does not represent nor define an exclusive set of items, but includes the possibility of other components and items being added to the list.

This specification is also based on the understanding of the inventor regarding the prior art. The prior art description should not be regarded as being authoritative disclosure on the true state of the prior art but rather as referencing considerations brought to the mind and attention of the inventor when developing this invention.

The claims defining the invention are:

1. A grapple head assembly which includes a head portion, and jaws pivotally attached to the head portion;
    a pivoting saw assembly on the outside of the head portion, and a saw motor for said saw assembly in the head portion;
    said jaws being attached to the head portion by pivot pins, of which at least one said pivot pin is hollow; and
    means which passes through said hollow pivot pin to transmit drive from said saw motor to the saw assembly.

2. A grapple head assembly as claimed in claim 1 in which said means comprises a drive shaft which is located within said hollow pivot pin.

3. A grapple head assembly as claimed in claim 2 in which said saw assembly is a chainsaw and is removably connected to the drive shaft.

4. A grapple head assembly as claimed in claim 3 in which the saw assembly is pivotable about an axis co-axial with that of a pivot pin.

5. A grapple head assembly as claimed in claim 1 in which said motor is substantially in-line with said pivot pin through which said means passes.

6. A grapple head assembly as claimed in claim 1 in which the saw motor is hydraulically powered.

7. A grapple head assembly as claimed in claim 1 which includes a hydraulic cylinder for controlling pivoting of the saw assembly.

8. A grapple head assembly as claimed in claim 1 in which the saw motor is substantially within the projected footprint of the grapple head assembly.

9. A grapple head assembly as claimed in claim 1 in which the saw motor is substantially within the projected footprint of the jaws of the grapple head assembly when the jaws are folded closed.

10. Log handling apparatus incorporating a grapple head assembly which includes a head portion, and jaws pivotally attached to the head portion;
    a pivoting saw assembly on the outside of the head portion, and a saw motor for said saw assembly in the head portion;
    said jaws being attached to the head portion by pivot pins, of which at least one said pivot pin is hollow; and
    means which passes through said hollow pivot pin to transmit drive from said saw motor to the saw assembly.

* * * * *